Oct. 18, 1966    R. C. MUHL    3,279,321
SCREW FEED MACHINE UNIT
Filed Feb. 24, 1964    4 Sheets-Sheet 1
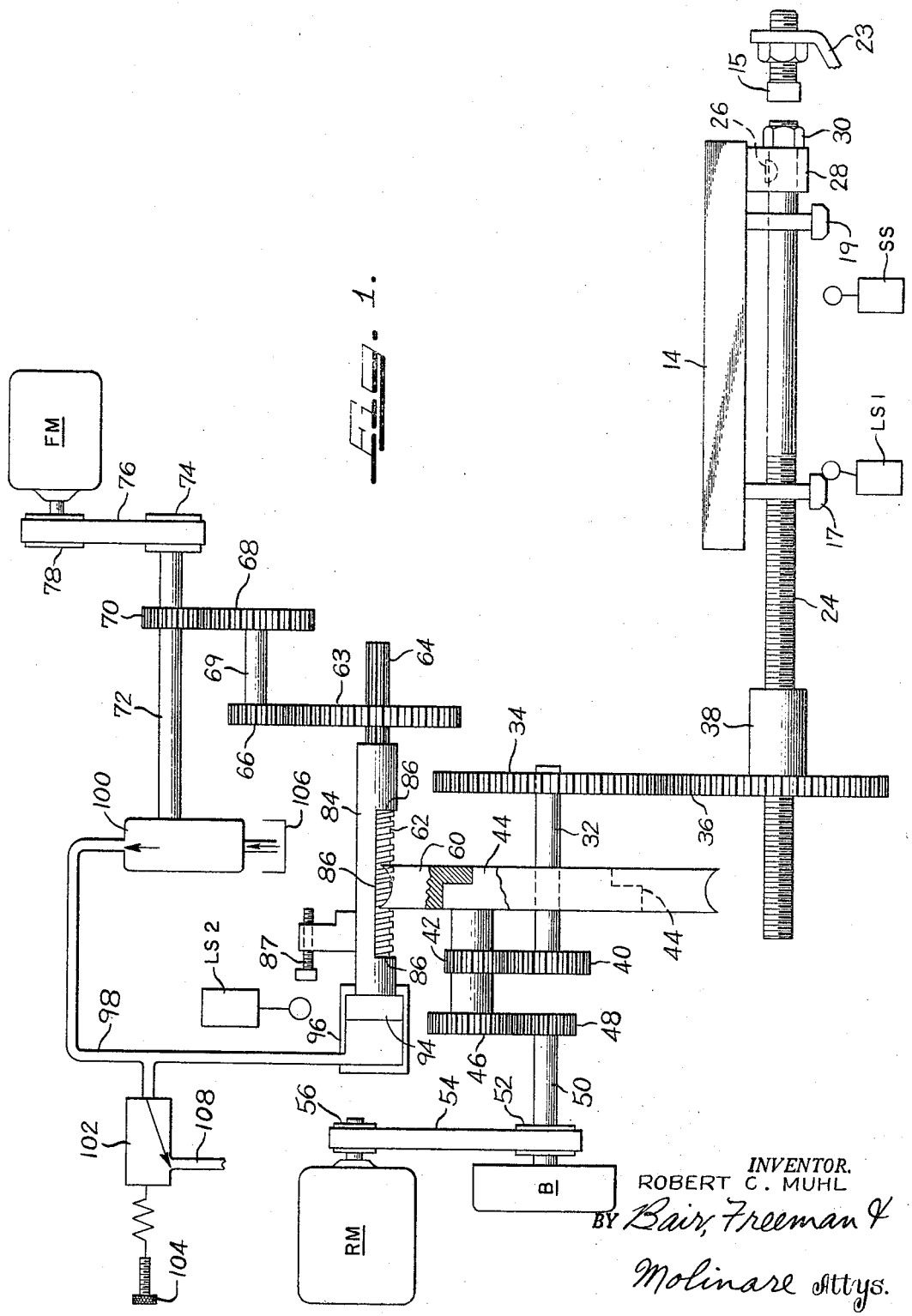
INVENTOR.
ROBERT C. MUHL
BY Bair, Freeman &
Molinare Attys.

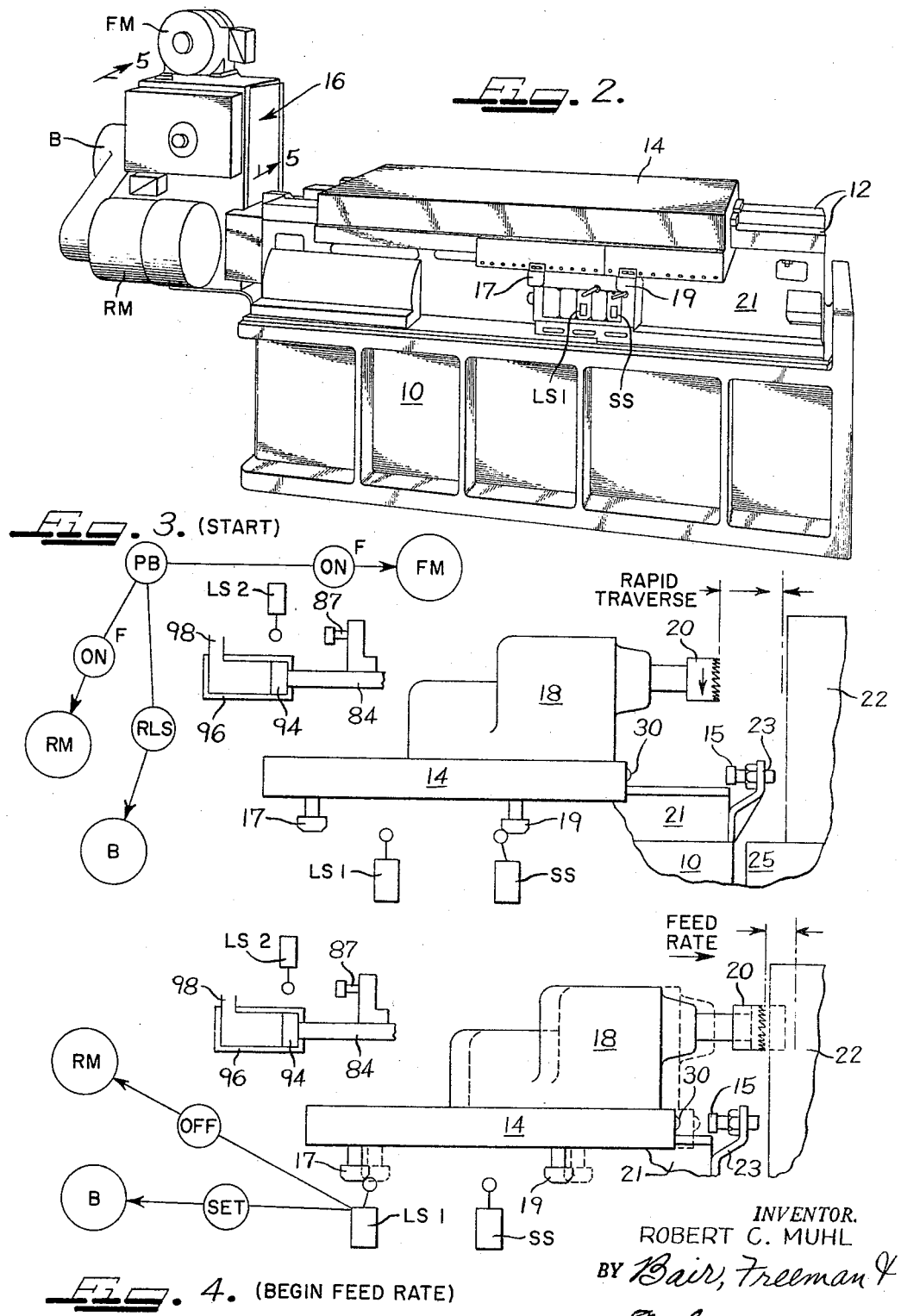

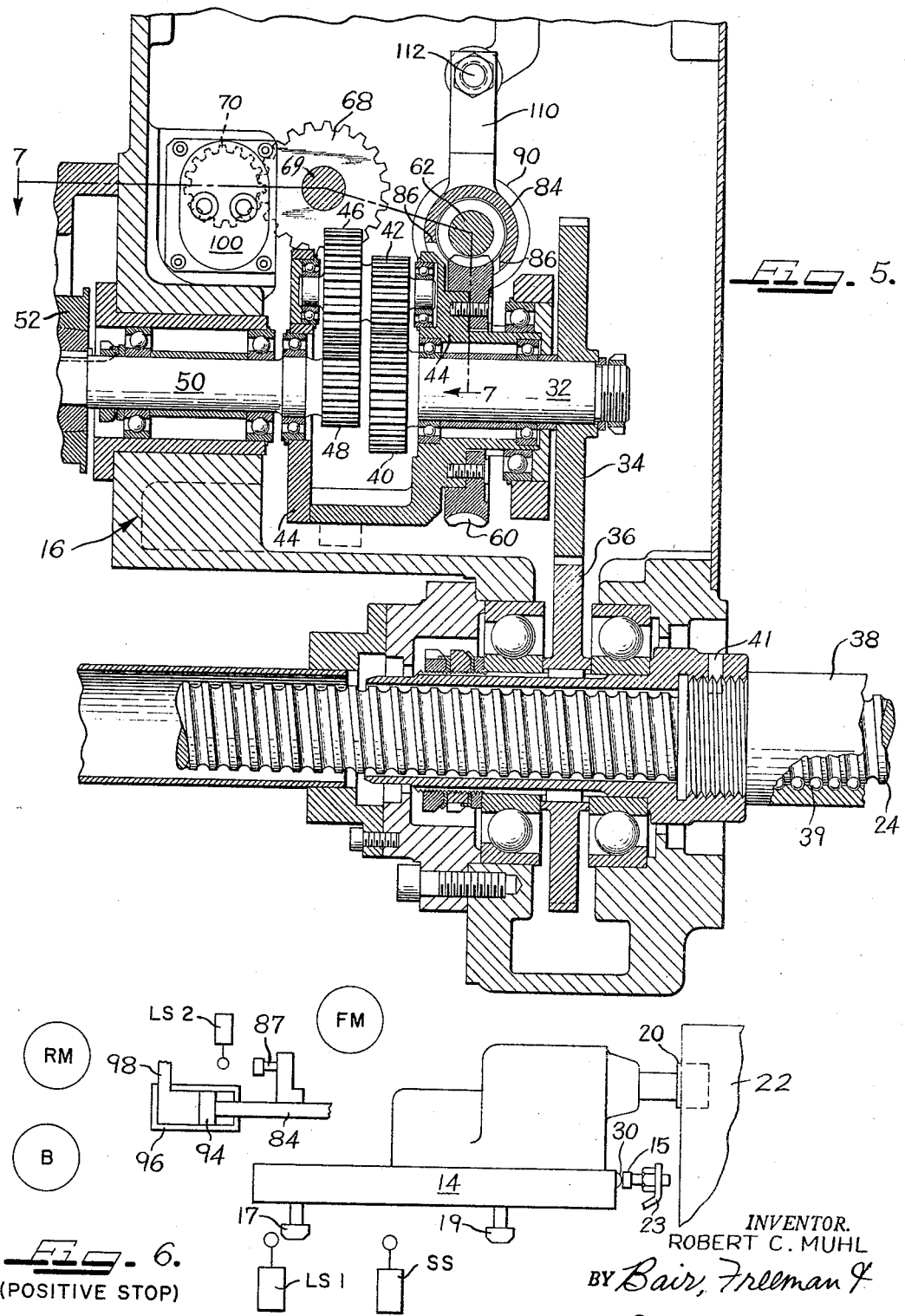

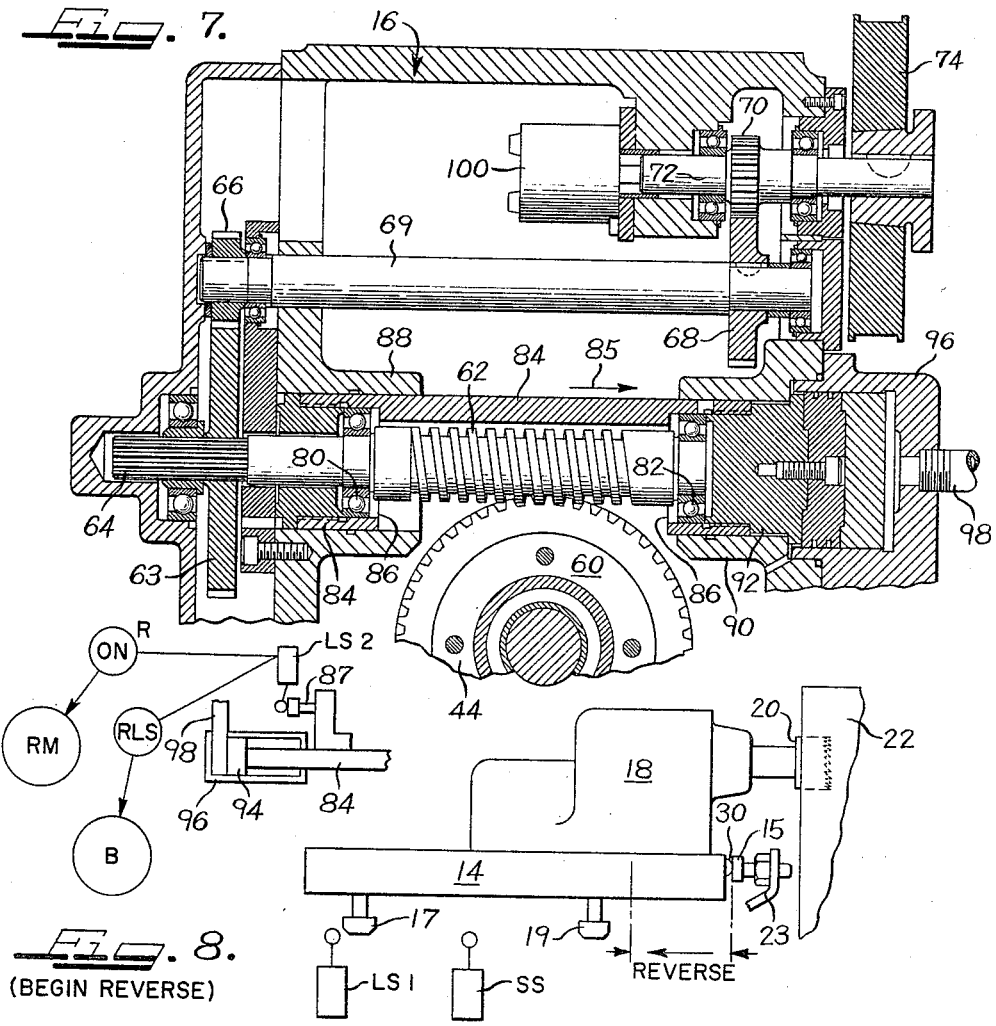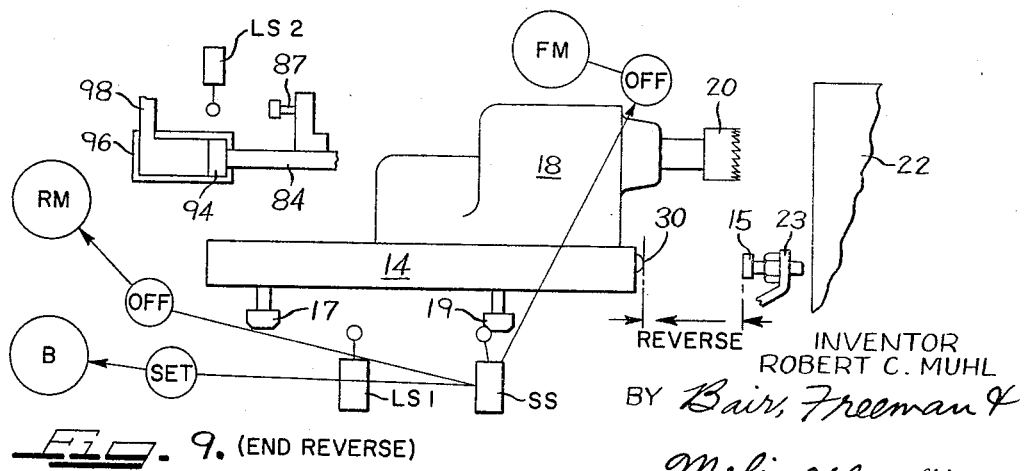

United States Patent Office 3,279,321
Patented Oct. 18, 1966

1

3,279,321
SCREW FEED MACHINE UNIT
Robert C. Muhl, Richmond, Ind., assignor to National Automatic Tool Company, Inc., Richmond, Ind., a corporation of Indiana
Filed Feb. 24, 1964, Ser. No. 346,948
9 Claims. (Cl. 90—21)

This invention relates to a screw feed machine unit such as one having a machine slide on which work is mounted to be operated upon by means of a tool such as a milling cutter, hone, drill or the like.

One object of the invention is to provide means for driving the machine slide or a comparable component first at a rapid rate and then at a slower rate with a positive, constant, yet adjustable force up to and against a positive stop, and to dwell against this stop with the same constant force for an adjustable length of time.

Another object is to provide means for propelling a machine slide or the like during machining operations comprising a rapid traverse gear train and a slow feed gear train which are so operatively connected together that both gear trains may be operated simultaneously during rapid traverse travel, and the rapid traverse gear train stopped while the slow feed gear train continues to operate during the work machining portion of an operating cycle such as a cutting operation performed by a tool on a work piece.

Still another object is to provide the slow feed gear train including a worm and worm gear wherein the worm gear is operatively connected to the rapid traverse gear train, a positive stop being provided for the machine slide to limit the depth of cut of a tool relative to the work piece whereupon the worm travels axially with respect to the worm gear.

A further object is to take advantage of the axial movement of the worm by providing hydraulic means opposing the thrust thereof to thereby hold the machine slide against the positive stop with predetermined pressure during a dwell period during which the tool cleans up at the bottom or end of its work stroke and thereby facilitates machining to accurate dimensions.

Still a further object is to provide a system of controls which permits starting of a machining operation by simultaneous operation of the two gear trains, and cessation of the rapid traverse gear train at the end of a rapid traverse travel whereupon continued operation of the slow feed gear train automatically effects the machining operation at the desired slow feed rate.

An additional object is to provide further controls, one of which is responsive to the axial movement of the worm to reverse the rapid traverse motor thereby reversing the direction of movement of the machine slide, and a control for stopping both gear trains at the end of the reverse motion of the machine slide, thus conditioning the device for the next machining operation.

Another additional object is to provide a novel gear train arrangement in which the rapid traverse gear train is driven by one power means and includes planetary gearing having a planetary gear carrier rotatable about the output means and provided with a worm gear, and the slow feed gear train includes a worm driven by another power means and meshing with the worm gear.

A further additional object is to provide an automatic brake means for the rapid traverse gear train to lock it against operation and thereby cause the planetary gearing to function for propelling the machine slide from the slow feed gear train only.

With these and other objects in view, my invention consists in the construction, arrangement and combination of the various parts of my screw feed machine unit,

2 whereby the objects above contemplated are attained, as hereinafter more fully set forth, pointed out in my claims and illustrated in detail on the accompanying drawings, wherein:

FIG. 1 is a diagrammatic view of a screw feed machine unit and the controls therefor embodying my invention;

FIG. 2 is a perspective view of a screw feed machine unit of the type shown diagrammatically in FIG. 1 and shows one physical arrangement for the parts thereof;

FIG. 3 is a diagrammatic view somewhat similar to FIG. 1 showing the significant parts of the unit in "START" position and illustrates diagrammatically the controlling operations at this time;

FIG. 4 is a similar diagrammatic view showing the position of parts at the "BEGIN FEED RATE" time;

FIG. 5 is an enlarged vertical sectional view on the line 5—5 of FIG. 2 showing some of the gearing of the gear trains in the unit;

FIG. 6 is a diagrammatic view similar to FIGS. 3 and 4 showing the parts in a "POSITIVE STOP" position;

FIG. 7 is a sectional view on the line 7—7 of FIG. 5 showing further elements of the gear trains in the unit;

FIG. 8 is a diagrammatic view similar to FIGS. 3, 4 and 6 showing the parts and controls at a "BEGIN REVERSE" time during the operating cycle, and FIG. 9 is a similar diagrammatic view showing the parts and controls at the end of the reverse travel of the machine slide.

On the accompanying drawings, and referring first to FIG. 2, a base 10 is shown for supporting a machine slide 14 on ways 12 of a way support 21 of the base so that the machine slide can be reciprocated longitudinally of the base. My screw feed machine unit comprises power means and gear trains contained in a housing 16 mounted at one end of the base 10.

My screw feed machine unit may be provided wherever it is desirable to propel a machine slide or comparable component at first a rapid rate for bringing a work piece and a tool relatively toward each other and into close proximity, and then at a slower rate for feeding the tool into the work piece. As an example, reference is made to FIG. 3 wherein a machine 18 is illustrated of the type which drives a tool such as a milling cutter 20. The machine 18 is mounted on the machine slide 14. A work piece 22 to be milled by the cutter 20 is suitably clamped to a work support 25. Alternatively, a tool may be mounted on the support 20 and the work piece 22 clamped to the machine slide 14.

As shown in FIG. 1 propelling means is provided for the machine slide 14 in the form of a threaded rod or lead screw (preferably a ball screw) 24 keyed as at 26 to a bracket 28 of the machine slide 14 so that the screw does not rotate relative thereto, and held by a clamp nut 30 so that it does not move longitudinally relative to the machine slide. The two thereby move as a unit.

The lead screw 24 is propelled longitudinally by gear train output means in the form of a shaft 32, gears 34 and 36 and a ball type lead screw nut 38 pinned at 41 to a sleeve 43 of the gear 36. An adjustable positive stop 15 is also provided for the machine slide 14, mounted in a bracket 23 on the way support 21.

A rapid traverse gear train is provided in the form of a gear 40 on the shaft 32, a planet gear 42 meshing therewith and carried by a planet gear carrier 44, a planet gear 46 connected to the planet gear 42 for rotating it, and a gear 48 on a shaft 50 for rotating the gear 46. The shaft 50 is provided with a pulley 52 which is driven by a belt 54 from a pulley 56 of a rapid traverse motor RM. A brake B is provided for the shaft 50 in the usual form of a normally applied brake which may be released by means of hydraulic pressure or electric current, and which is set by release of hydraulic pressure, or de-energization in the case of an electrically operated brake. Since such a brake is conventional, I will not go into detail as to its construction.

The output shaft 32 is also driven by a slow feed gear train consisting of a worm gear 60 secured to the planet gear carrier 44 and meshing with a worm 62 which in turn is driven by a gear 63 slidably but non-rotatably mounted on a splined portion 64 of the worm 62. The gear 63 is driven by change gears 66 and 68 and by a pinion 70 on a shaft 72 which in turn is driven by a pulley 74, a belt 76 and a pulley 78 from a feed motor FM.

Mechanical features of the foregoing described elements such as bearings, thrust bearings, mounting bosses for the bearings and the like are shown in detail in FIGS. 5 and 7. In FIG. 7 it will be noted that the worm 62 is supported in combination radial and thrust bearings 80 and 82 which in turn are supported in a worm carrier tube 84. The tube 84 is cut out on one side as indicated at 86 to accommodate the worm gear 60. The tube 84 is slidable in bosses 88 and 90, and the direction of thrust thereon caused by the reaction of the worm 62 against the worm gear 60 is indicated by an arrow 85.

The end of the tube 84 opposite the spline 64 is provided with a plug 92 to which a piston 94 is secured and located in a cylinder 96. A conduit 98 leads from an oil pump 100 which is driven by the shaft 72 and provides a supply of oil for the cylinder.

Excess oil is bled through a pressure relief valve 102 which is adjustable as indicated at 104 so as to maintain a desired predetermined hydraulic pressure in the cylinder 96 for a purpose which will hereinafter appear.

The oil pump 100 receives oil from a sump or the like 106 and the outlet of the pressure relief valve may advantageously be in the form of a lubricant line 108 leading to the various bearings of the unit for lubricating them before the oil is returned to the sump 106.

Referring to FIGS. 1 and 3 limit switches LS1 and LS2 and a stop switch SS are shown. The machine slide 14 is provided with actuators 17 and 19 for the switches LS1 and SS, and the tube 84 is provided with an adjustable screw 87 to serve as an actuator for the switch LS2. FIG. 3 shows starting means for a cycle of operation in the form of a manually operable push button PB. As shown in FIG. 2 the actuators 17 and 19 are adjustable along the slide 14.

*Practical operation*

Without going into the electrical and/or hydraulic circuits, relay arrangements and the like, the sequence of operation is shown by means of connecting arrows in FIGS. 3, 4, 6, 8 and 9. When the start button PB (FIG. 3) is depressed it operates the usual solenoid valves and pneumatic and/or hydraulic controls as well as the electrical circuits involved which will energize the rapid traverse motor RM and the feed motor FM in a forward direction as indicated "ON$^F$," and release the brake B as indicated "RLS." Electric and hydraulic circuitry of this kind is standard equipment in the machine tool art and need not be gone into in detail. The rapid traverse distance of travel is indicated and also the direction of such travel.

With both motors RM and FM operating, the machine slide 14 will move forward at a rapid rate by reason of the motor RM driving the ball nut 38 straight through the gears 48, 46, 42, 40, 34 and 36 without planetary action. This is possible because the friction provided by the small lead angle on the worm wheel 60 prevents it from rotating the worm 62 and thus the worm wheel cannot turn. By the same token in most applications and particularly in the present application the worm can be run at the same time which will either be additive to or subtractive from the rapid traverse rate of travel depending on whether the latter is forward or reverse. In the operation being described, the motor FM is rotating the worm gear 60 forwardly at a slow rate so that the actual rate of the machine slide is the rapid rate plus the slow rate.

Thus both the rapid traverse motor and the feed motor start forward at the same time and the feed motor continues to run forward even during a rapid reverse portion of the machine cycle as will hereinafter appear.

When the rapid traverse distance has been taken up as in FIGS. 1 and 4, it is desirable to shift to the feed rate indicated in FIG. 4 and this is accomplished by the actuator 17 striking the limit switch LS1 which cuts out the rapid traverse motor RM and sets the brake B automatically as indicated "OFF" and "SET," respectively, and the machine slide will move forwardly as to the dotted position and progress on to the positive stop position of FIG. 6. In FIG. 5, the gear 46 becomes a planet gear walking around the sun gear 48 by rotation of the worm gear 60 and the planet gear carrier 44 from the worm 62, and drives the gear 40 which becomes the driven gear member of the planetary system and causes the lead screw nut 38 to be rotated by the gears 34 and 36 at feed rate. Thus the feed rate is obtained from the feed motor only and its gear train 70, 68, 66, 63 and 62 to the worm gear 60.

FIG. 6 shows the right-hand end of the ball screw 24 engaged with the stop 15 so that the machine slide is thus positively stopped and cannot proceed further. Since the worm gear 60 cannot now rotate as long as the brake B remains set the worm 62 will commence travelling to the left (shown about half way) in opposition to the hydraulic pressure in the cylinder 96. This pressure is adjusted at 104 to furnish a total force on the piston equal to the thrust of the worm 62 developed by the thrust required at the machine slide 14 due to the machining operation. This also acts as a safety feature for dull tools and other malfunctioning conditions. The hydraulic pressure may be of very low order because of the mechanical advantage afforded by the worm and worm gear, planetary system and ball type lead screw 24. Thrust capacity is also controlled by capacity of the brake B to make the planetary system operate.

Further travel of the piston 94 in the cylinder 96 will eventually cause the adjusting screw 85 to trip the limit switch LS2 (FIG. 8) which releases the brake B and energizes the rapid traverse motor M in the reverse direction at a much greater speed and accordingly the machine slide 14 reverses at rapid traverse speed minus feed speed.

When the actuator 19 strikes the stop switch SS as in FIG. 9, the operating or machine cycle is terminated by de-energizing both the rapid traverse motor and the feed motor and setting the brake B as indicated.

From the foregoing specification it will be obvious that I have provided a means for driving a machine slide or the like at a rapid rate and then at a slower rate with a positive constant yet adjustable force up to and against a positive stop and to dwell against the stop with the same constant force for an adjustable length of time. Summarizing the operation through a complete machine cycle; oil from the hydraulic pump which is driven throughout the cycle maintains a constant pressure and constant supply of oil in the cylinder 96. This pressure operates in opposition to the thrust of the worm 62 after the positive stop position of FIG. 6 has been attained, thereby causing thrust load to build up in the worm which is transmitted to the worm carrier tube through the thrust bearings. This force exceeds the force in the hydraulic cylinder and allows the piston, worm carrier tube and worm to travel while the machine slide remains against its positive stop with its original constant force. After the worm and its carrier tube have travelled for a predetermined distance, the limit switch LS2 comes into operation to terminate the machine cycle. The dwell time for the tool to clean up at the bottom or end of its work stroke is the time the machine slide is against the positive stop.

Some changes may be made in the construction and arrangement of the parts of my screw feed machine unit without departing from the real spirit and purpose of my

I claim as my invention:

1. In a screw feed machine unit, a machine slide and lead screw means for propelling said slide during machining operations comprising a rapid traverse gear train having output means to said lead screw means, first power means for operating said rapid traverse gear train, a slow feed gear train so operatively connected to said rapid traverse gear train as to operate said output means, second power means for operating said slow feed gear train, means for energizing said first and second power means in a forward direction to effect rapid traverse of said machine slide by the operation of both gear trains in conjunction with each other, and control means operable by the position of said machine slide at the end of a rapid traverse travel and the beginning of a feed rate travel to stop said rapid traverse gear train whereupon only said slow feed gear train is operable through said output means on said lead screw means, said slow feed gear train including a worm driven by said second power means, a worm gear driven by said worm, hydraulic means opposing the thrust of said worm, a positive stop for said machine slide to limit the depth of cut of a tool relative to a work piece, and a pressure relief valve for regulating the opposing force of said hydraulic means with respect to the thrust of said worm.

2. A screw feed machine unit in accordance with claim 1 wherein said slow feed gear train includes a worm driven by said second power means, a worm gear driven by said worm, means opposing the thrust of said worm, a positive stop for said machine slide to limit the depth of cut of a tool relative to a work piece, said worm upon overcoming said opposing means travelling axially with respect to said worm gear, and control means operable thereby after predetermined travel thereof to energize said first power means in a reverse direction.

3. A screw feed machine unit in accordance with claim 2 wherein control means is responsive to the position of said machine slide at the end of its reverse movement to de-energize both said first and second power means.

4. A screw feed machine unit in accordance with claim 3 wherein a brake is provided for said first power means, and means is provided to set said brake when said first control means is operated, and to set said brake when said second control means is operated.

5. A screw feed machine unit in accordance with claim 1 wherein said worm upon overcoming said opposing means travels axially with respect to said worm gear, and control means operable thereby after predetermined travel thereof to energize said first power means in a reverse direction.

6. A screw feed machine unit in accordance with claim 5 wherein control means is actuated by said machine slide at the end of its reverse movement to de-energize both said first and second power means.

7. A screw feed machine unit in accordance with claim 6 wherein a brake is provided for said first power means, and means is provided to set said brake when said first control means is operated, to release said brake when said second control means is operated, and to set said brake when said third control means is operated.

8. In a screw feed machine unit, a machine slide and lead screw means for propelling said slide during machining operations comprising a rapid traverse gear train having output means to said lead screw means, first power means for operating said rapid traverse gear train, a slow feed gear train so operatively connected to said rapid traverse gear train as to operate said output means, second power means for operating said slow feed gear train, means for energizing said first and second power means in a forward direction to effect rapid traverse of said machine slide by the operation of both gear trains in conjunction with each other, and control means operable by the position of said machine slide at the end of a rapid traverse travel and the beginning of a feed rate travel to stop said rapid traverse gear train whereupon only said slow feed gear train is operable through said output means on said lead screw means, said rapid traverse gear train including planetary gearing having a planetary gear carrier rotatable about said output means and provided with a worm gear, and said slow feed gear train including a worm driven by said second power means and meshing with said worm gear, said worm being axially movable upon stoppage of said worm gear, means to resist such movement, and means to predetermine the degree of resistance.

9. A screw feed machine unit in accordance with claim 8 wherein positive stop means is provided for said machine slide to result in such stoppage when the machine assumes a final position.

References Cited by the Examiner

UNITED STATES PATENTS

| 2,398,346 | 4/1946 | Anderson | 90—21 |
|---|---|---|---|
| 2,489,832 | 11/1949 | Symonds | 318—261 |
| 2,493,005 | 1/1950 | Mahnke et al. | 318—261 |
| 2,653,519 | 9/1953 | Armitage et al. | 90—21 |

WILLIAM W. DYER, JR., *Primary Examiner.*